United States Patent [19]

Nelson

[11] 4,054,884

[45] Oct. 18, 1977

[54] FACSIMILE COPY MEDIUM

[75] Inventor: Richard L. Nelson, New York, N.Y.

[73] Assignee: Exxon Research and Engineering Company, Linden, N.J.

[21] Appl. No.: 702,459

[22] Filed: July 6, 1976

Related U.S. Application Data

[60] Continuation of Ser. No. 533,194, Dec. 16, 1974, abandoned, which is a division of Ser. No. 333,616, Feb. 20, 1973, Pat. No. 3,872,239.

[51] Int. Cl.² .................................. G01D 15/28
[52] U.S. Cl. .................................. 346/134; 346/138; 358/191
[58] Field of Search ........ 346/134, 138, 103, 125–128, 346/132; 360/136; 274/44; 101/415.1; 40/125 A, 306; 358/291, 290, 289

[56] References Cited

U.S. PATENT DOCUMENTS

| 251,634 | 12/1881 | Ransom | 346/103 X |
|---|---|---|---|
| 1,052,940 | 2/1913 | Morris | 346/138 X |
| 1,676,848 | 7/1928 | Au | 346/138 |
| 1,735,894 | 11/1929 | Coombs | 40/306 |
| 1,883,421 | 10/1932 | Stevens | 40/125 A X |
| 2,096,351 | 10/1937 | Semonsen | 40/125 A X |
| 2,145,072 | 1/1939 | Cooley | 358/291 |
| 2,710,191 | 6/1955 | Williams | 346/138 X |

*Primary Examiner*—Joseph W. Hartary
*Attorney, Agent, or Firm*—Norman L. Norris

[57] ABSTRACT

A facsimile transceiver comprising a document/copy receiving drum, a motor for rotation of the drum about the drum axis and a read/write head mounted for linear movement in a direction parallel with the drum axis. When the transceiver is operating in the receive mode, the copy medium having adhesive along at least one edge circumscribes the drum in a closed loop so as to eliminate the necessity for transmitter-receiver angular synchronizing signals which would otherwise be required for locating the copy margin adjacent the edge of the copy paper. After completion of a transmission, the copy medium is severed along a line so as to provide an appropriate margin for the copied information content. The closed loop is formed from a single sheet having adhesive along at least one edge for purposes of forming a bond between opposite edges of the sheet when the sheet is applied to the drum. The read/write head includes a cutting wheel which is adapted to sever the sheet along the appropriate line when the head is moved in a cutting stroke along the length of the drum with the cutter wheel in contact with the sheet.

6 Claims, 8 Drawing Figures

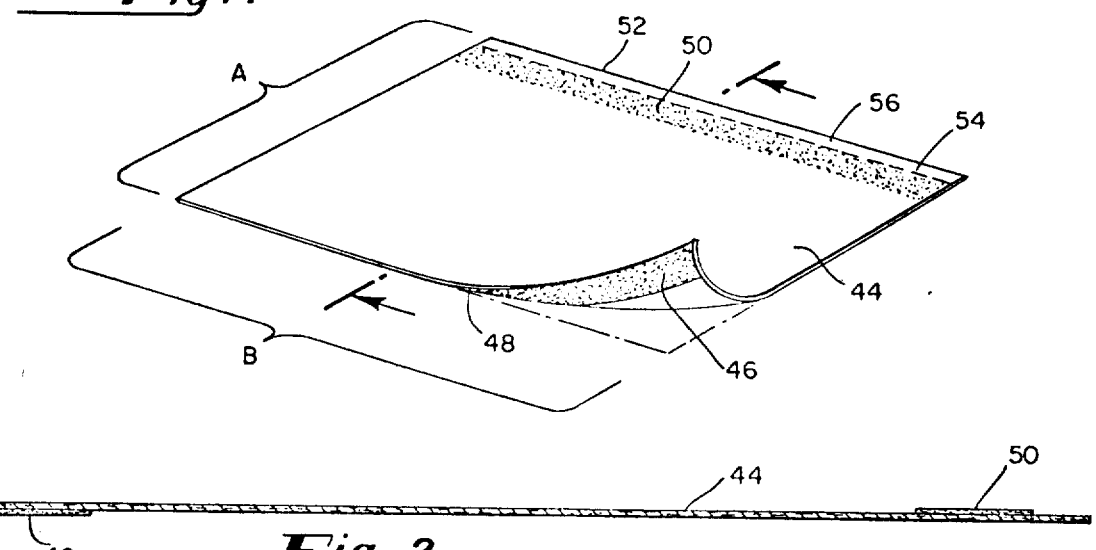
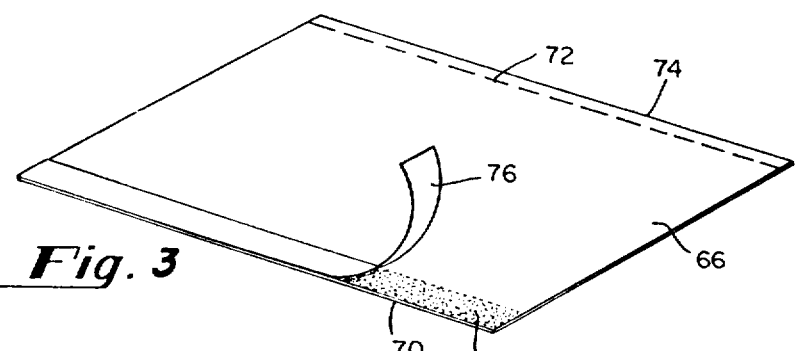
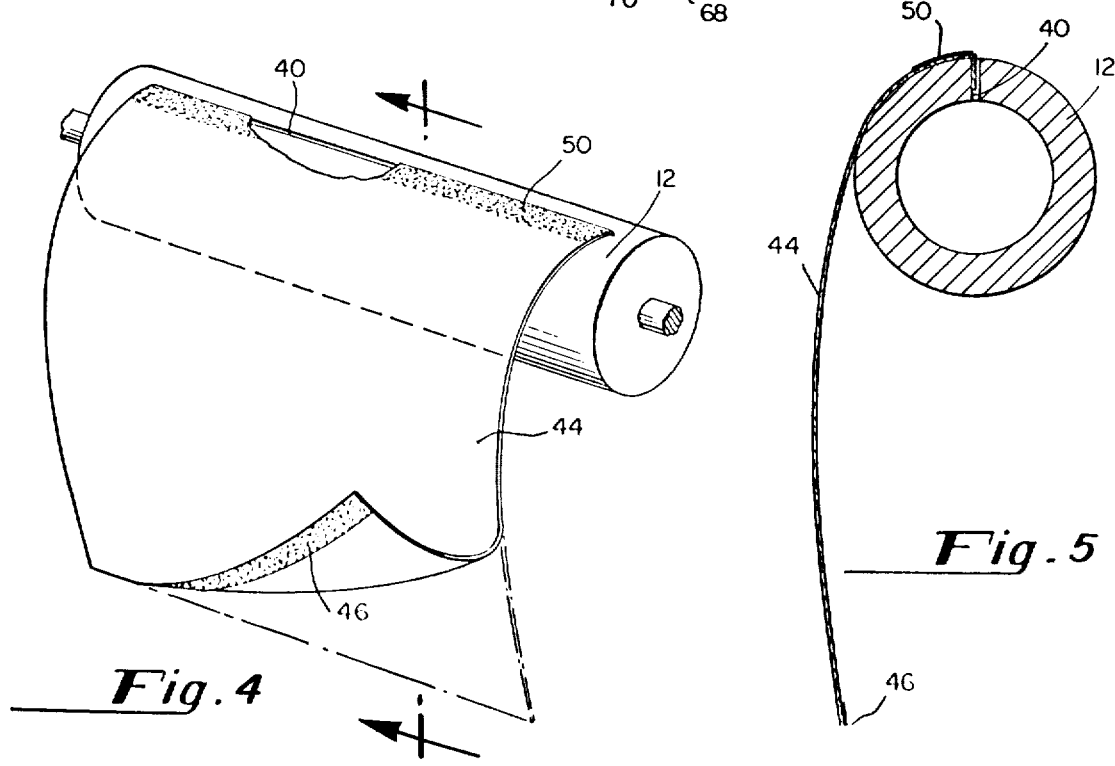

FACSIMILE COPY MEDIUM

RELATED APPLICATIONS

This is a continuation of application Ser. No. 533,194 filed Dec. 16, 1974, now abandoned which is in turn a division of application Ser. No. 333,616 filed Feb. 20, 1973, now patent No. 3,872,239. Certain aspects of the facsimile apparatus are disclosed in my application Ser. No. 333,615 abandoned in favor of my continuation-in-part application Ser. No. 412,989 filed Nov. 5, 1973, now U.S. Pat. No. 3,956,587; a copending application of Luther R Winters, Jr. Ser. No. 332,927 filed Feb. 16, 1973, now U.S. Pat. No. 3,872,248, and a copending application of Herbert P. Ford, Jr. Ser. No. 332,925 filed Feb. 16, 1973, now U.S. Pat. No. 3,859,459, all of which are assigned to the assignee of this invention.

BACKGROUND OF THE INVENTION

This invention relates to facsimile systems comprising a transmitter, a receiver and a communications network such as telephone lines therebetween. The transmitter employs a scanning or reading element which reads the information content of an original document. The original document is moved relative to the reading means such that successive paths are scanned whereupon the output of the scanning element is fed to a device such as a photodetector which converts the variations in light intensity received by the scanning element due to variations in the reflectivity of the scanned document to electrical signals. These electrical signals then convey information concerning the radiation absorption, emission or reflection of the scanned document. The electrical information-bearing signals are then transmitted to a receiving unit over suitable means such as a telephone network where the receiving unit converts the electrical information-bearing signals from the transmitting unit to marks or images on a receiving copy medium so that the received copy is a reasonable facsimile of the original scanned document.

In one type of conventional facsimile system, the copy medium comprises a sheet of paper which is applied to the receiving drum with opposite edges of the paper abutting or overlapping so as to form as open loop having a discontinuous copy medium surface. In order to assure that the margin of the copy is appropriately located with respect to the edge of the sheet, angular synchronizing signals are utilized. These signals assure that the position of the document edge passes the reading head of the transmitter at the same time that the copy edge passes the writing head of the receiver, and this in turn assures the proper location of the copy margin with respect to the edge of the copy sheet. In other words, the copied matter is placed on the copy sheet in substantial conformance with its location on the document being copied.

U.S. Pat. No. 3,582,550 — Latanzi is illustrative of the complexity which is involved in maintaining synchronization between transmitter and receiver drums in prior art systems. In this particular prior art system, a variable frequency generator drives the drum motor at the receiver in response to an error signal indicative of the relative positions and speeds of the transmitter and receiver drums. An elaborate clutch mechanism is shown in U.S. Pat. No. 3,569,628 — Okleshen which is utilized in effecting synchronous phase operations between a transmitter and a receiver. These synchronizing arrangements add expense to a facsimile system as well as making it difficult to increase the rate of transmission.

SUMMARY OF THE INVENTION

It is an object of this invention to provide a relatively low cost facsimile system.

It is a more specific object of this invention to provide a copy medium for a relatively low cost facsimile system which does not require synchronizing signals.

In accordance with this important aspect of the invention, the copy medium comprises a sheet of material adapted to be marked by the writing means of the receiver. The sheet includes adhesive means carried adjacent one edge thereof so as to permit the formation of an adhesive bond between areas adjacent opposite edge of the sheet when the areas are overlapped to form a closed loop. A line of weakness may be provided along one edge of the sheet to facilitate folding thereof and thereby permit the portion of the sheet located between the line of weakness and its adjacent edge to be inserted into a clamp or slot of the receiver drum.

In one embodiment of the invention, a sheet-like facsimile copy medium formed from a severed closed loop adapted to be mounted on a facsimile drum comprises a first segment of sheet material having one preformed edge and another edge formed by severing said closed loop, and a second segment of sheet material having one preformed edge and another edge formed by severing said closed loop. A portion of the first segment adjacent to one edge thereof overlaps a portion of the second segment adjacent the other edge thereof so as to permit markings on the second segment terminating at the overlapped portion of the second segment to be substantially continuous with the markings of the first segment adjacent and up to the one preformed edge. Adhesive means form a permanently bonded seam between the portion of the first segment and the portion of the second segment with the severed edges being spaced from the overlapping portions at the seam.

BRIEF DESCRIPTION OF THE DRAWINGS

FIG. 1 is a perspective view of a sheet of copy paper having self-bonding adhesive on both sides which may be utilized in a facsimile transceiver;

FIG. 2 is a sectional view taken along line 2—2 of FIG. 3;

FIG. 3 is a perspective view of another embodiment of the sheet of copy paper wherein an adhesive strip is provided on only one side of the copy paper;

FIG. 4 is a perspective view of the copy paper of FIG. 1 being applied to the cylindrical drum of a facsimile transceiver FIG. 5 is a cross-sectional view taken along line 5—5 of FIG. 6;

DETAILED DESCRIPTION OF A PREFERRED EMBODIMENT

Figure 6:
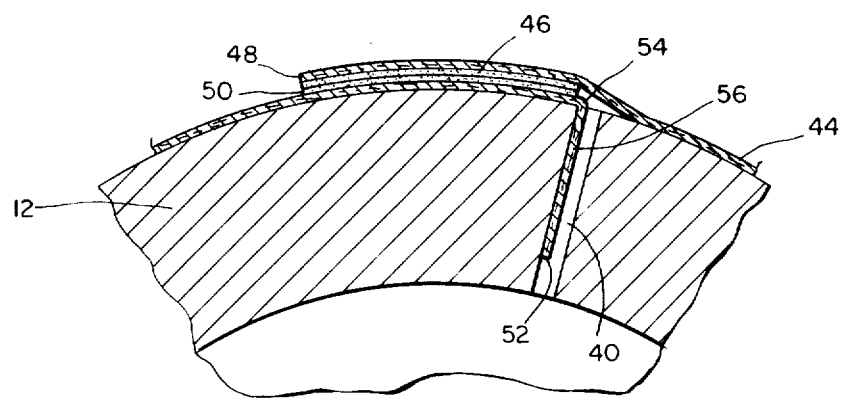
FIG. 6 is an enlarged partial cross-sectional view of the paper and clamping slot shown in FIG. 4.

In accordance with this invention and shown in FIGS. 4-6, a copy medium applied to the drum 12 forms a closed or endless loop thereabout so as to eliminate the necessity for synchronizing the initial relative angular position of the original document on a transmitting transceiver drum with respect to the initial relative angular position of the copy medium on a receiving transceiver drum 12 which includes an axial slot 40 which extends for the entire length of the drum 12 at the periphery thereof. The slot 40 has a clamping mechanism associated therewith, which is opened and closed by a finger engagable member 42 which is shown in detail in U.S. Pat. No. 3,872,239 and incorporated herein by reference. The nature of the copy medium which is inserted into the slot 40 with the capability of forming a closed loop of continuous copy medium will now be described in substantial detail. In accordance with this invention and as shown in FIGS. 1 and 2, the copy medium applied to the durm comprises a sheet of paper 44 having a width A slightly larger than the circumference of the drum 12 and a length B slightly smaller than the length of the drum 12. The paper 44 includes on one face a strip of adhesive material 46 which is located immediately adjacent a first preformed edge 48 which extends along the length of the paper 44. This adhesive material may be a contact adhesive which bonds when brought into contact with the opposite side and edge of the paper or itself. Preferably, it is characterized by bonding only to a like material. Another adhesive strip 50, slightly narrower than the strip 46, is located adjacent the opposite preformed edge 52. Adhesive strip 50 is located on the opposite face of the paper 44 and spaced slightly back from the edge 52 behind a perforated line of weakness 54. The adhesive strip 50 comprises the same material as the strip 46 and therefore will only stick to the adhesive strip 46.

The paper 44 may be easily applied to the drum 12 as depicted in FIGS. 4, 5 and 6 by inserting the strip 56 between the perforated line 54 and the edge 52 into the slot 40 so that the line 54 aligns with the near edge of the slot 40 and wrapping the paper 44 around the drum 12 until the adhesive strip 46 is brought into overlapping contact with the adhesive strip 50. As shown in FIG. 6, when the paper is placed in circumscribing relationship around the drum 12, the strips 46 and 50 will be disposed in overlapping relationship and the extra width of the strip 46 will insure that none of the adhesive strip 50 is exposed and permit clamping in the slot 40 to assure that the paper is secured in proper place on the drum 12. The perforations 54 not only provide means of conveniently bending the strip 56 so as to allow for easy insertion into the slot 40, but also provide a means for aligning paper 44 by aligning the perforations 54 with the near or forward edge of the slot 40. Of course, the perforations may be replaced by a score line, printed line or other suitable means of marking or weakening the paper 44 along that line so as to facilitate clamping and proper alignment of the paper on the drum 12.

Figure 7:
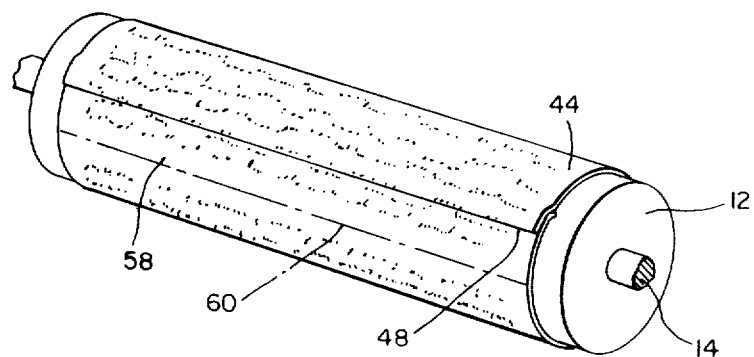
FIG. 7 is a perspective view of the copy medium secured in a closed loop around the drum shown in FIG. 4 with copied information thereon.
Figure 8:
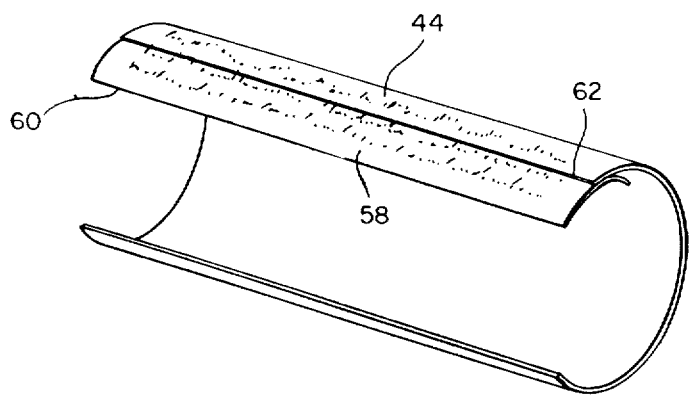
FIG. 8 is a perspective view of the copy medium shown in FIG. 7 after severing and removal from the drum.

Once the paper has been applied to the drum 12 and the strip 46 has been bonded to the strip 50 as best shown in FIG. 6, the facsimile transceiver as disclosed in U.S. Pat. No. 3,872,239 and incorporated herein by reference may be placed in the receive mode and the message received from the transmitting transceiver. When the transmission of the information is complete as depicted in FIG. 7, the sheet 44 may be cut along an appropriate line 60 so as to properly center the information content on the sheet 44, i.e., located the edge of the paper so as to provide a suitable margin 58 at the severed resulting edge 60 of the sheet 44 as shown in FIG. 8. The single sheet 44 will have a seam 62 where the adhesive strips 50 and 46 overlap, and bond two segments of the sheet together. However, this seam is not considered objectionable since the copy medium may be continuously written or marked on adjacent and even over the edge 52 at the seam 62. The strip 56 may be removed by tearing along the perforations 54.

In FIG. 3, the copy medium comprises a sheet 66 having a single strip of adhesive material 68 located immediately adjacent edge 70 while the perforated line of weakness 72 is located adjacent the opposite edge 74. In this particular embodiment, the adhesive strip 68 is capable of forming a bond with different materials. Accordingly, in order to prevent the strip 68 from sticking inadvertently to another surface, a protective covering 76 which may comprise plastic or some other readily removable material such as wax paper is provided. The covering 76 may then be removed just prior to applying the sheet 66 to the drum 12.

Although the copy medium has been described as electrosensitive and capable of being marked on in response to the current applied at the stylus of the writing means, other types of copy medium and writing means may be utilized. For example, the copy medium may be marked on in response to the heat generated by the stylus at the contact point. This is known as thermal printing, or the stylus may be maintained in mechanical contact with the paper, thus printing through a carbon between the stylus and the paper or rupturing dye containing capsules on the paper surface commonly known as NCR paper. Also, a modulated light source, such as a light emitting diode may be utilized which is focused on a photo or thermally or ultra-violet sensitive paper.

Although a specific embodiment of the invention has been shown and described, other embodiments and modifications may occur to those of ordinary skill in the art, and the appended claims are intended to cover any such modifications which fall within the true spirit and scope of the invention.

What is claimed:

1. A sheet-like facsimile copy medium formed from a severed closed loop adapted to be mounted on a facsimile drum comprising:
   a first segment of sheet material having one preformed edge and another edge formed by severing said closed loop, one side of said first segment carrying markings up to said one preformed edge;
   a second segment of sheet material having one preformed edge and another edge formed by severing said closed loop, one side of said second segment also carrying markings;
   a portion of said first segment adjacent said one edge thereof overlapping a portion of said second segment adjacent said one edge thereof, said markings on said one side of said second segment terminating at the overlapped portion of said second segment and being substantially continuous with said markings on said first segment adjacent said one preformed edge; and
   adhesive means forming a permanently bonded seam between said portion of said first segment and said portion of said second segment, said severed edges being spaced from said overlapping portions.

2. The facsimile copy medium of claim 1 wherein said second segment includes a strip between said one preformed edge and said portion thereof, said strip being separable from said first segment.

3. The facsimile copy medium of claim 1 wherein said first segment and said second segment are devoid of markings adjacent said severed edges.

4. The facsimile copy medium of claim 1 wherein said second segment includes a line of weakness between said one preformed edge of said second segment and said bonded seam.

5. The facsimile copy medium of claim 4 wherein said line of weakness is located immediately adjacent said bonded seam.

6. The facsimile copy medium of claim 1 wherein said adhesive means and said bonded seam extend up to said one preformed edge of said first segment.

* * * * *